United States Patent

Baker et al.

[15] 3,673,200

[45] June 27, 1972

[54] 3(2-SEC-BUTYL-4,6-DIMITROPHENOXY)-1,2-BENZISOTHIOZOLE 1,1-DIOXIDE

[72] Inventors: Joseph W. Baker; Gerald L. Bachman, both of Kirkwood, Mo.

[73] Assignee: Monsanto Company, St. Louis, Mo.

[22] Filed: Jan. 2, 1970

[21] Appl. No.: 377

[52] U.S. Cl. ..........................260/301, 71/91, 260/294.8 C
[51] Int. Cl. .........................................................C07d 91/12
[58] Field of Search..................................260/301, 294.8 C

[56] References Cited

OTHER PUBLICATIONS

Hettler, Chem. Abstracts, 69:360172 (1968).
Meadow et al., Chem. Abstracts, 47:1696–7 (1953).
Meadow et al., Chem. Abstracts, 37:2360–1 (1943).

Primary Examiner—Alex Mazel
Assistant Examiner—R. J. Gallagher
Attorney—Neal E. Willis, Paul C. Krizov and Harold M. Dixon

[57] ABSTRACT

Herbicidal compositions and methods with a substituted benzisothiazole - 1,1- dioxide of the formula:

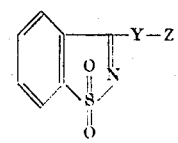

where Y is oxygen or sulfur and

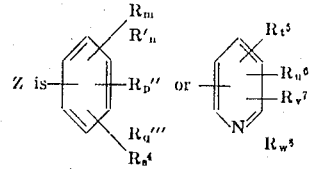

in which R, R′, R″, R‴, $R^4$, $R^5$, $R^6$, $R^7$, and $R^8$ are independently selected from the group hydrogen, halo, nitro, cyano, alkyl, having a maximum of eight carbon atoms, aralkyl having a maximum of 14 carbon atoms, haloalkyl having a maximum of eight carbon atoms, and alkoxy having a minimum of five carbon atoms, m, n, p, q, s, t, u, v and w are integers of 0 or 1.

Compounds of the foregoing definition wherein the sum of m, n, p, q, and s is 2 or more and Z is

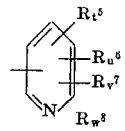

are new compounds.

1 Claim, No Drawings

3(2-SEC-BUTYL-4,6-DIMITROPHENOXY)-1,2-BENZISOTHIOZOLE 1,1-DIOXIDE

This invention relates to herbicidal compositions and to the related method of controlling the growth of plants.

The term "herbicide" as used herein and in the appended claims means materials which (1) effectively control the growth of all plants in a given locus or (2) selectively control the growth of one or more plant species in the presence of other plants. In like manner, "herbicidal" is used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "herbicidal formulation" as used herein means a benzisothiazole - 1,1 - dioxide derivative composition of this invention in combination with an adjuvant to be defined hereinbelow.

In accordance with this invention it has been discovered that benzisothiazole - 1,1 - dioxide derivatives represented by the following formula have herbicidal activity:

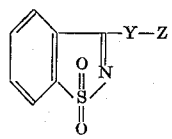

where Y is oxygen or sulfur and

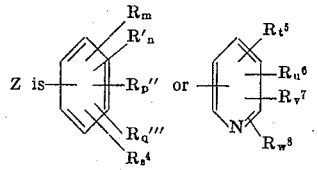

in which R, R', R'', R''', $R^4$, $R^5$, $R^6$, $R^7$, and $R^8$, are independently selected from the group hydrogen, halo, nitro, cyano, alkyl, and cycloalkyls, having a maximum of 14 carbon atoms, haloalkyl having a maximum of eight carbon atoms, and alkoxy having a maximum of five carbon atoms, and $m, n, p, q, s, t$ and $u$ are integers of 0 or 1.

Compounds of the foregoing definition wherein the sum of $m, n, p, q$, and $s$ is 2 or more and

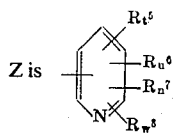

are new compounds.

Preferred compounds according to this invention are benzisothiazoles-1,1-dioxides of the formula.

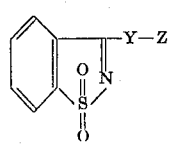

where Y is oxygen or sulfur and

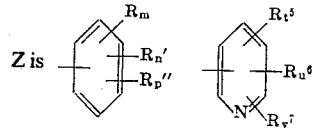

in which R, R', R'', $R^5$, $R^6$, and $R^7$, is hydrogen, halo, nitro, alkyls of a maximum of four carbon atoms, tolyl, and halomethyl, the sum of $m, n,$ and $p$ or $s, t$, and $u$ varies from 1 through 3.

Illustrative examples of halogens contemplated are the entire group consisting of chlorine, bromine, fluorine and iodine. Examples of alkyls contemplated are methyl, ethyl, isopropyl, butyl, tert. butyl and octyl. Examples of the alkoxy substituents are methoxy, ethoxy, and butoxy. Examples of haloalkyl are chloromethyl, tri-fluoromethyl, 1, 2 - dibromopropyl and 1-chloro - 3 - bromo-5-fluorooctyl.

Illustrative examples of herbicidally active compounds according to this invention are:

1. 3-(2-sec-butyl-4,6-dinitrophenoxy)-1,2-benzisothiazole-1,1-dioxide
2. 3-(2-n-octyl-6-nitrophenoxy)-1,2-benzisothiazole-1,1-dioxide
3. 3-(4,6-dinitrophenoxy)-1,2-benzisothiazole-1,1-dioxide
4. 3-(2-chloro-4,6-dinitrophenoxy)-1,2-benzisothiazole-1,1-dioxide
5. 3-(2-methoxy-4,6-dinitrophenoxy)-1,2-benzisothiazole-1,1-dioxide
6. 3-(2-bromo-4,6-dinitrophenoxy)-1,2-benzisothiazole-1,1-dioxide
7. 3-(2cyano-4,6-dinitrophenoxy)-1,2yi,-dioxide
8. 3-(2-trichloromethyl-4,6-dinitrophenoxy)-1,2-benzisothiazole-1,1-dioxide
9. 3-(2,4,6-trimethylphenoxy)-1,2-benzisothiazole-1,1-dioxide
10. 3-(2-chlorophenoxy)-1,2-benzisothiazole-1,1-dioxide
11. 3-(3-chlorophenoxy)-1,2-benzisothiazole-1,1-dioxide
12. 3-(4-bromophenoxy)-1,2-benzisothiazole-1,1-dioxide
13. 3-(2,4-difluorophenoxy)-1,2-benzisothiazole-1,1-dioxide
14. 3-(2-chloro-4-iodophenoxy)-1,2-benziosothiazole-1,1-dioxide
15. 3-(2,3,4,5,6-pentabromophenoxy)-1,2-benzisothiazole-1,1-dioxide
16. 3-(4-butoxyphenoxy)-1,2-benzisothiazole-1,1-dioxide
17. 3-(2-chloro-6-ethoxyphenoxy)-1,2-benzisothiazole-1,1-dioxide
18. 3-(4-trifluoromethylphenoxy)-1,2-benzisothiazole-1,1-dioxide
19. 3-(2,4-trifluoromethylphenoxy)-1,2-benzisothiazole-1,1-dioxide
20. 3-(2-methyl-trifluoromethylphenoxy)-1,2-benzisothiazole-1,1-dioxide
21. 3-(2-bromo-4-trifluoromethyl-6-sec-butylphenoxy)-1,2-benzisothiazole-1,1-dioxide
22. 3-(2-chloro-4-trifluoromethyl-6-nitrophenoxy)-1,2-benzisothiazole-1,1-dioxide
23. 3-(4-cyanophenoxy)-1,2-benzisothiazole-1,1-dioxide
24. 3-(pyridyloxy)-1,2-benzisothiazole-1,1-dioxide
25. 3-(4-chloro-2-pyridyloxy)-1,2-benzisothiazole-1,1-dioxide
26. 3-(4-trifluoromethyl-2-pyridyloxy)-1,2-benzisothiazole-1,1-dioxide
27. 3-(4-bromo-5-methyl-2-pyridyloxy)-1,2-benzisothiazole-1,1-dioxide
28. 3-(4-nitro-2-pyridyloxy)-1,2-benzisothiazole-1,1-dioxide
29. 3-(4-pyridyloxy)-1,2-benzisothiazole-1,1-dioxide
30. 3-(2-chloro-4-pyridyloxy)-1,2-benzisothiazole-1,1-dioxide
31. 3-(3-methyl-4-chloro-2-pyridyloxy)-1,2-benzisothiazole-1,1-dioxide 32. 3-(4-tolyl-2-pyridyloxy)-1,2-benzisothiazole-1,1-dioxide 33. 3-)4-methoxy-2-pyridyloxy)-1,2-benzisothiazole-1,1-dioxide 34. 3-(2-pyridylthio)-1,2-benzisothiazole-1,1-dioxide 35. 3-(4-pyridylthio)-1,2-benzisothiazole-1,1-dioxide 36. 3-(4-bromo-2-pyridylthio)-1,2-benzisothiazole-1,1-dioxide 37. 3-(4-ethoxy-2-pyridylthio)-1,2-benzisothiazole-1,1-dioxide 38. 3-(3-methyl-2-pyridylthio)-1,2-benzisothiazole-1,1-dioxide 39. 3-(4-trifluoromethyl-2-pyridylthio)-1,2-benzisothiazole-1,1-dioxide 40. 3-(3-chloro-4-methyl-2-pyridylthio)-1,2-benzisothiazole-1,1-dioxide 41. 3-(4-nitro-2-pyridylthio)-1,2-benzisothiazole-1,1-dioxide 42. 3-(3,5-dinitro-2-pyridylthio)-1,2-benzisothiazole-1,1-dioxide 43. 3-(3,4,5-triethyl-2-pyridylthio)-1,2-benzisothiazole-1,1-dioxide 44. 3-(3,5-dichloro-2-pyridylthio)-1,2-

45. 3-(3,5-trifluoromethyl-2-pyridylthio)-1,2-benzisothiazole-1,1-dioxide 46. 3-(3,4,6-trichloro-2-pyridylthio)-1,2-

47. 3-(4-hexyl-2-pyridylthio)1,2-benzisothiazole-1,1-dioxide 49. 3-(2-benzyl phenoxy)-1,2-benzisothiazole-1,1-dioxide 49. 3-(2-benzyl-4-chlorophenoxy)-1,2-benzisothiazole-1,1-dioxide Illustratively compounds of this invention can be prepared by reacting pseudosaccharin chloride with a phenol, thiophenol, or pyridine having substituents corresponding to that desired in the final product. The two reactants are refluxed in the presence of an acid acceptor and a solvent such as toluene. The reaction products are filtered and the product is recovered by removing the toluene solvent from the filtrate.

Having now described many ramifications and embodiments of the present invention, it is believed that an understanding thereof will be facilitated and made more full by the following examples. In these examples, as well as in the specification and appended claims, parts and percentages are by weight unless otherwise indicated.

EXAMPLE 1

To a suitable vessel equipped with an agitator, reflux condenser and thermometer was charged 5.3 parts of pseudosaccharin chloride, 3.2 parts of 2-chlorophenol, and 2.6 parts of triethylamine in 150 ml. of toluene and the mixture refluxed for 2 hours. The amine hydrochloride was filtered from the hot solution. The solvent was removed from the filtrate and the residual solid was recrystallized from toluene.

The 5.2 parts of solid product had a cream color, a melting point of 196°–197° C and was a 70.9 percent yield.

EXAMPLE 2

The pre-emergent herbicidal activity of the active ingredients of this invention is demonstrated as follows: A good grade of top soil is placed in aluminum pans and compacted to a depth of three-eighths inch to one-half inch from the top of each pan. A predetermined number of seeds of the test plant species are placed on top of the soil in the pans. The seeds are covered with a ⅜ inch layer of soil and the pan leveled. The active ingredient is applied by spraying the surface of the top layer of soil with a herbicidal formulation containing a sufficient amount of active ingredient to obtain the desired rate of active ingredient per acre. For soil incorporation, the chemical is sprayed on and mixed into the soil used to cover the seeds.

The seed-containing pans are placed on a wet sand bench and maintained under ordinary conditions of sunlight and watering. The plants are observed at the end of approximately 14 days and the results recorded. The herbicidal activity index is based on the average percent control of each seed lot. The herbicidal activity index is converted to a relative numerical scale for the sake of brevity and simplicity in the table. The pre-emergent herbicidal activity index used is defined as follows:

| Average Percent Control | Numerical Scale |
| --- | --- |
| 0 to 25 | 0 |
| 26 to 50 | 1 |
| 51 to 75 | 2 |
| 76 to 100 | 3 |

In Table I below, the dosage rate, method of application, the spectrum of plant seeds treated, and the results of tests carried out according to the above procedure are indicated for several compounds of this invention.

TABLE I

| Compound | Dosage rate, lbs./A. | Wheat | Morning glory | Wild oat | Brome | Rye grass | Radish | Sugar beet | Cotton | Corn | Foxtail | Barnyard grass |
| --- | --- | --- | --- | --- | --- | --- | --- | --- | --- | --- | --- | --- |
| A | 10 | | 1 | 0 | 0 | 0 | 0 | 3 | | | 0 | |
| B | 10 | | 1 | 1 | 1 | 1 | 2 | 3 | | | 0 | |
| C | 10 | | 0 | 0 | 0 | 0 | 2 | 2 | | | 0 | |
| D | 10 | | 0 | 3 | 3 | 3 | 3 | 3 | | | 3 | |
| D | 1[1] | 0 | | 0 | 1 | | | 3 | 0 | 0 | | 0 |

| Compound | Crab grass | Pigweed | Soybean | Wild buckwheat | Tomato | Sorghum | Rice | Smartweed | Cocklebur | Lambsquarter | Hemp sesbania | Velvet leaf |
| --- | --- | --- | --- | --- | --- | --- | --- | --- | --- | --- | --- | --- |
| A | 2 | 0 | 0 | 0 | 0 | 0 | | | | | | |
| B | 0 | 3 | 1 | 3 | 0 | 1 | | | | | | |
| C | 0 | 1 | 0 | 1 | 0 | 1 | | | | | | |
| D | 3 | 3 | 0 | 3 | 3 | 3 | | | | | | |
| D | 0 | 3 | 0 | | | | 1 | 3 | 0 | 3 | 3 | 2 |

[1] Chemical incorporated, the others in the table were by surface application.

A = 3-(4-chlorophenylthio)-1,2-benzisothiazole-1,1-dioxide
B = 3-(2,4-dichlorophenoxy)-1,2-benzisothiazole-1,1-dioxide
C = 3-(3-chlorophenoxy)-1,2-benzisothiazole-1,1-dioxide
D = 3(4,6-dinitro-2-sec-butylphenoxy)-1,2-benzisothiazole-1,1-dioxide

EXAMPLE 2

In a post-emergent herbicidal test, the active ingredients in each case is applied in spray form to 14 or 21 day old specimens of the plants (species indicated hereinafter). The herbicidal sprays are either water-wettable powders are organic solvent-water solutions containing surface active agent

TABLE II

| Compound | Concentration, percent | Wheat | Morning glory | Wild oat | Brome | Rye grass | Radish | Sugar beet | Cotton | Corn | Foxtail | Barnyard grass | Crab grass | Pigweed | Soybean | Wild buckwheat | Tomato | Sorghum | Rice | Smartweed | Cocklebur | Lambsquarter | Hemp sesbania | Velvet leaf | Age of plant at application, weeks |
|---|---|---|---|---|---|---|---|---|---|---|---|---|---|---|---|---|---|---|---|---|---|---|---|---|---|
| E | 0.5 | -- | 1 | 0 | 0 | 0 | 2 | 0 | -- | -- | 1 | -- | 1 | 1 | 0 | 0 | 1 | 0 | -- | -- | -- | -- | -- | -- | 3 |
| F | 0.5 | -- | 2 | 0 | 0 | 0 | 3 | 0 | -- | -- | 0 | -- | 0 | 3 | 0 | 0 | 0 | 0 | -- | -- | -- | -- | -- | -- | 3 |
| G | 0.5 | -- | 2 | 1 | 0 | 0 | 1 | 1 | -- | -- | 0 | -- | 0 | 1 | 1 | 0 | 1 | 2 | -- | -- | -- | -- | -- | -- | 3 |
| H | 0.5 | -- | 1 | 1 | 1 | 0 | 2 | 0 | -- | -- | 0 | -- | 1 | 3 | 0 | 0 | 0 | 0 | -- | -- | -- | -- | -- | -- | 3 |
| I | 0.5 | -- | 2 | 0 | 0 | 0 | 0 | 1 | -- | -- | 0 | -- | 1 | 0 | 0 | 0 | 0 | 0 | -- | -- | -- | -- | -- | -- | 3 |
| J | 0.5 | -- | 1 | 0 | 0 | 0 | 1 | 2 | -- | 1 | 1 | -- | 2 | 4 | 1 | 0 | 2 | 0 | -- | -- | -- | -- | -- | -- | 2 |
| K | 0.5 | -- | 2 | 0 | 2 | 1 | 4 | 4 | -- | -- | 3 | -- | 2 | 3 | 1 | 0 | 0 | 1 | 3 | 4 | 2 | 3 | 4 | 4 | 3 |
| L | 0.2 | 1 | 3 | 1 | 1 | 0 | 4 | 3 | 1 | -- | 3 | 2 | 1 | 3 | 2 | 4 | 4 | 1 | -- | -- | -- | -- | -- | -- | 3 |

Note.—0.5 concentration equals a dosage rate of about 9–10 lbs./A.

and varying amounts of the active ingredient. The solutions are applied to the plants in different pans at rates equal to the desired rate of active ingredient on a per acre basis. The treated plants are placed in a greenhouse and the effects are observed and recorded after approximately 14 days.

This post-emergent herbicidal activity index used in this example is defined as follows:

| Numerical Scale | Herbicidal Activity |
|---|---|
| 0 | No phytotoxicity |
| 1 | Slight phytotoxicity |
| 2 | Moderate phytotoxicity |
| 3 | Severe phytotoxicity |
| 4 | Plants dead |

In Table II the dosage rate, the spectrum of plants treated and the results obtained by the above procedure are indicated for several compounds of this invention.

E = 3-(2-pyridylthio)-1,2-benzisothiazole-1,1-dioxide
F = 3-(2-chlorophenoxy)-1,2-benzisothiazole-1,1-dioxide
G = 3-(4-chlorophenoxy)-1,2-benzisothiazole-1,1-dioxide
H = 3-(2,3-dichlorophenoxy)-1,2-benzisothiazole-1,1-dioxide
I = 3-phenoxy-1,2-benzisothiazole-1,1-dioxide
J = 3-(2,3,4,5,6-pentabromophenoxy)-1,2-benzisothiazole-1,1-dioxide
K = 3-(3-trifluoromethylphenoxy)-1,2-benzisothiazole-1,1-dioxide
L = 3(4,6-dinitro-2'sec-butylphenoxy)-1,2-benzisothiazole-1,1-dioxide In foliar treatment for the modification of vegetative growth, the active ingredients are applied in amounts from about 0.1 to about 50 or more pounds per acre, preferably about 0.1 to 15 pounds per acre in foliar treatments. In soil applications, it is desirable that the active ingredients be distributed to a depth of at least 0.2 inches. In pre-emergence herbicidal applications the active ingredients are usually applied in amounts from about 0.1 to 25 pounds per acre but preferably from about 0.1 to 10 pounds per acre. It is believed that one skilled in the art can readily determine from the teachings of this specification, including example, the general procedure for any application.

In practicing the herbicidal methods of this invention, the active ingredients can be used alone or in combination with a material referred to in the art as an adjuvant in liquid or solid form. The usual purpose of adjuvants are to facilitate application of the herbicidal composition. Herbicidal formulations are prepared by admixing the active ingredient with one or more adjuvants which includes diluents, extenders, carriers and conditioning agents to provide compositions in the form of finely-divided particulate solids, granules, pellets, solutions, dispersions or emulsions. Thus the active ingredient can be used with an adjuvant such as a finely-divided particulate solid, a liquid of organic origin, water, a wetting agent, dispersing agent, an emulsifying agent or any suitable combination of these. The herbicidal formulations usually contain from about 0.01 percent to about 99 percent by weight of active ingredient.

Suitable adjuvants of the foregoing types are not here defined in detail as to composition, particle size, relative amounts etc. since they are well known in the art.

In addition to adjuvants the compounds of this invention can be used in combination with fertilizers and/or other pesticides such as insecticides, fungicides, nematocides, and/or other phytotoxicants, and the like.

In addition to herbicidal activity, compounds of this invention, e.g. 3-(2-cyclopentyl)-4-chlorophenoxy-1,2-benzothiazole-1,1-dioxide; 2-dehydro-3-(2'-benzyl-4'-chlorophenoxy)-1,2-benzisothiazole-1,1-dioxide, 3-(3-chlorophenylthio)-1,2-benzisothiazole-1,1-dioxide and the like exhibit gram-positive microbiological activity at dilutions as high as 1 part per million.

Having now described the invention, many ramifications and modified embodiments will readily occur to those skilled in the art: In so far as such variations do not depart from the spirit and scope of the invention described in this applications, they are intended to be embraced by the appended claims in their broadest construction.

What is claimed is:

1. The compound 3(2-sec-butyl-4,6-dinitro-phenoxy)-1,2-benzisothiazole-1,1-dioxide.

* * * * *